US012709885B2

(12) United States Patent
Sorrosa et al.

(10) Patent No.: US 12,709,885 B2
(45) Date of Patent: Aug. 18, 2026

(54) STORM WATER DRAIN FILTER DEVICE

(71) Applicants: Katleen Cruz Sorrosa, Concord, NC (US); Adolfo Cruz Gasga, Concord, NC (US)

(72) Inventors: Katleen Cruz Sorrosa, Concord, NC (US); Adolfo Cruz Gasga, Concord, NC (US)

( * ) Notice: Subject to any disclaimer, the term of this patent is extended or adjusted under 35 U.S.C. 154(b) by 360 days.

(21) Appl. No.: 18/444,993

(22) Filed: Feb. 19, 2024

(65) Prior Publication Data

US 2024/0279916 A1 Aug. 22, 2024

Related U.S. Application Data

(60) Provisional application No. 63/485,579, filed on Feb. 17, 2023.

(51) Int. Cl.
*E03F 5/04* (2006.01)
*B01D 29/33* (2006.01)

(52) U.S. Cl.
CPC ............ *E03F 5/0404* (2013.01); *B01D 29/33* (2013.01)

(58) Field of Classification Search
CPC ............................... B01D 29/33; E03F 5/0404
See application file for complete search history.

(56) References Cited

U.S. PATENT DOCUMENTS 8,679,328 B2 * 3/2014 Hebert .................. E03F 5/0404 210/163
2004/0173522 A1 * 9/2004 Allard .................. E03F 5/0404 210/170.03

* cited by examiner

*Primary Examiner* — Dirk R Bass
(74) *Attorney, Agent, or Firm* — NK Patent Law

(57) ABSTRACT

A storm water drain filter device includes a basket structure having side walls affixed together along opposed edges, a top panel affixed to a top edge of each of the side walls and a bottom opening defined in a plane between the bottom edges of the side walls, opposite the top edges. At least a portion of the basket structure forms a frustum shape where the top panel is a base thereof. The side walls and top panel are made of a mesh material having a plurality of openings that are porous to water. The top panel defines an aperture therethrough with a pivotally attached covering door panel and locking attachment. The basket structure also has at least one handle and spike extending away from the plane of the bottom opening on an opposed side to the top panel.

19 Claims, 13 Drawing Sheets

STORM WATER DRAIN FILTER DEVICE

CROSS-REFERENCE TO RELATED APPLICATIONS

This application claims the benefit of U.S. Provisional Patent Application No. 63/485,579, filed on Feb. 17, 2023, the entire content of which is incorporated by reference herein.

TECHNICAL FIELD

The subject matter of this application pertains to water filtration and storm water control systems. More specifically, it pertains to storm water drain filter systems that can capture and remove debris from runoff water before it flows into the drain.

BACKGROUND

Storm water management is an important aspect of modern life. Most streets, parking, lots, and just about any other paved surface comprise storm water drains so that liquids, mostly water from rain or melting snow, will drain away instead of accumulating on the surface. Often these surfaces have a slight grade to guide water to the drains. On construction projects, junction boxes and drains are among the first elements to be installed.

Moreover, the United States has federal requirements relating to water bodies into which storm water commonly is drained, most notably the Clean Water Act. This act has a goal of regulating discharges to enable all "Waters of the United States" to be in "fishable" and "swimable" conditions. To achieve these requirements, storm water drainage pipes often require treatment before conveying storm water into receiving water bodies. As a result, a wide variety of technologies have been developed to treat storm water and improve the water quality. A variety of these technologies relate to filtering storm water after it enters into a drain. However, a problem is that these technologies can often become clogged with debris and require some level of service before they are serviceable.

The clogging problem arises because water is often not the only thing flushed towards a storm water drain. Indeed, flowing water washes all types of refuse towards a storm water drain. Leaves, plastic bags, disposable cups, soda cans, twigs, and bigger branches are all common litter that could flow into a storm water drain, collecting at and clogging the storm water drain or filtration system, or causing issues further down the sewer, like in a junction box, forming a larger and more problematic blockage. Such litter can also have damaging effects on the environment, even if it didn't cause clogging.

Moreover, the above issues are even more problematic in and around unfinished construction sites, as the above litter along with mud and dirt are often more prevalent and often flow into such drains. Often this risk is mitigated only by a standard storm drain grate which covers the drain and blocks the largest refuse from entering the drain. However, on construction projects it is common for such standard grates to not be installed over such drains or junction boxes yet. Even where a standard grate is installed, it is largely ineffective at preventing the passthrough of smaller materials, including mud, dirt, and litter, and, even when it is effective, can collect debris around and over the drain. The collection of mud, dirt, and litter around or over a drain can cause a partial or total blockage leading to flooding issues and slowing down work.

Devices to runoff water before it enters a storm water drain, beyond simple grates, are known in the art, but often their design, such as the size and shape of the device and any porous openings, the added maintenance requirements, prohibitive costs, lack of resilience, and lack of reusability have impeded their acceptance, safety, and/or performance while preventing flooding and protecting the environment. For example, devices and systems to filter water prior to having it engaged with a storm water drain can often be damaged on construction sites, leading them to become ineffective and requiring their replacement, which can be labor intensive.

Accordingly, there remains an unmet need to provide a storm water drain filter device with enhanced acceptance, safety, and performance, which has a beneficial design to reduce the labor to install, reduce maintenance, reduce costs, improve resilience, allow reusability, protect the environment, and reduce clogging and flooding in and around drain areas by providing filtering water before it even enters a storm water drain.

BRIEF SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In view of the above, certain aspects of the presently disclosed device provides enhanced acceptance, safety, and performance, and has a beneficial design to reduce the labor to install, reduce maintenance, reduce costs, improve resilience, allow reusability, protect the environment, and reduce clogging and flooding in and around drain areas by providing filtration of water before it even enters a storm water drain.

According to one or more embodiments, a storm water drain filter device is provided that comprises a basket structure comprising a plurality of side walls affixed together along opposed edges, a top panel affixed to a first edge of each of the plurality of side walls and a bottom opening disposed in a plane defined between a second edge of each of the plurality of side walls where the second edge is opposed to the first. In embodiments, the first edge of each of the plurality of sidewalls has a shorter length than the second edge thereof such that at least a portion of the basket structure forms a frustum shape including the top panel as a base of thereof.

In embodiments, the side walls and top panel of the device comprise a mesh material having a plurality of openings that are porous to water. The device, in various embodiments, also further comprises at least one spike having a pointed end disposed adjacent the bottom opening such that the pointed end is disposed on an opposed side of the plane of the bottom opening to the top panel. According to various aspects, the basket structure is placed such that the bottom opening is disposed around a drain and the top panel is disposed a distance above the drain and the mesh material of the basket structure reduces debris entering the drain.

In various embodiments, the length of the second edge of each of the plurality of side walls is within a range of 39 and 41 inches and 49 and 51 inches.

In particular embodiments, the top panel defines an aperture therethrough allow access to an interior space through the top panel without adjustment of the basket structure. In specific embodiments, the device further comprises a door panel covering the aperture in the top panel. In certain embodiments, at least a portion of the door panel is pivotally attached such that the door panel is configured to move between a closed position where the door panel covers the aperture and an open position where the aperture is uncovered. In additional embodiments, the door panel further comprises a locking attachment whereby the door panel is secured into at least one of the open position and the closed position.

In various embodiments, the device further comprises at least one handle affixed to the basket structure to help position the device. In further embodiments, the at least one handle is affixed to at least one of the top panel and one of the plurality of side walls.

In embodiments, the device further comprises at least one rod portion affixed to a portion of the basket structure and disposed adjacent the bottom opening having a first end extending from the plane of the bottom opening towards a plane in which the top panel is disposed. In various embodiments, the at least one rod portion is removably affixed to the basket structure. In further embodiments, the at least one spike extends from a second end of the at least one rod opposed to the first end thereof. In certain embodiments, the at least one spike is removably affixed to the second end of the at least one rod portion. In additional embodiments, the device further comprises an extension member comprising a bottom end and opposed top end, wherein the bottom end of the extension member is attached to the first end of at least one of the at least one rod portion and wherein the top end is disposed on an opposed side of the plane in which the top panel is disposed from the bottom end. In further embodiments, the bottom end of the extension member is removably affixed to the first end of at least one of the at least one rod portion. In certain embodiments, the device further comprises at least one extension member affixed to the basket structure and extending away from the basket structure through the plane in which the top panel is disposed. In certain embodiments, the at least one extension member is removably affixed to the basket structure. In further embodiments, the at least one spike is removably affixed to the basket structure.

In various embodiments, the plurality of openings in the mesh material comprising the side walls adjacent the second edge differ in size from the plurality of openings in the mesh material adjacent the first edge. In certain embodiments, the plurality of openings in the mesh material adjacent the second edge are smaller than the plurality of openings adjacent the first edge.

In various embodiments, the top panel of the basket structure comprises a signaling device comprising at least one of a painted portion and a reflective marker to increase visibility of the basket structure.

In various embodiments, portions of the basket structure are pivotally connected and the basket structure is configured such that the portions may be pivoted between an engaged configuration to a collapsed configuration in which the top panel and the side walls are disposed in an identical plane.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTION

Figure 1:
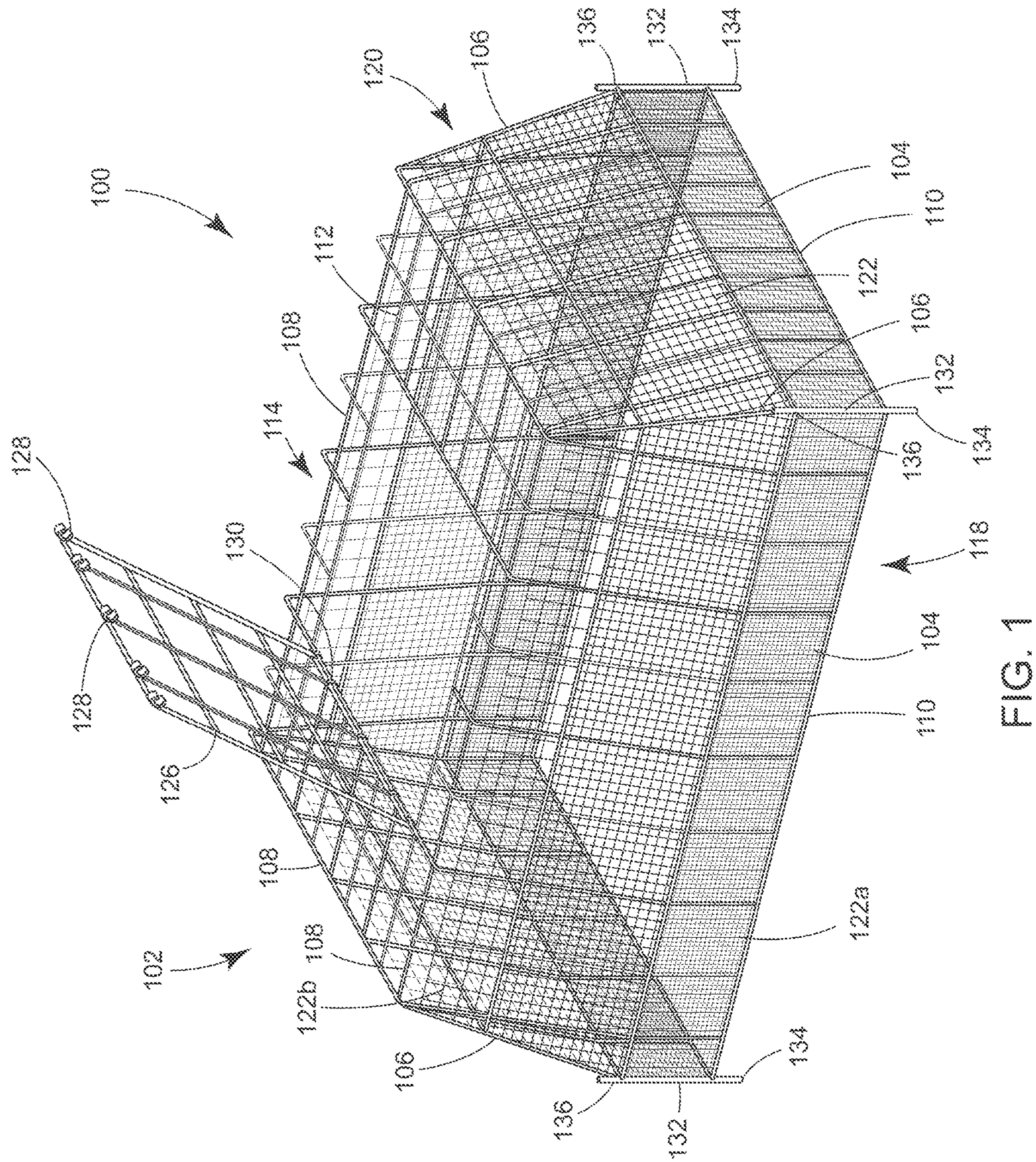
FIG. 1 is a perspective view of storm water drain filter device according to at least one embodiment.

The following descriptions are illustrative and are not to be construed as limiting. Numerous specific details are described to provide a thorough understanding of the disclosure. In certain instances, however, well-known or conventional details are not described in order to avoid obscuring the description. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way.

Alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure.

Overview

Embodiments of a storm water drain filter device 100 that prevents contamination of water which likely will end up entering natural bodies of water—lakes, ponds, rivers, streams, oceans—and stops drain pipes from clogging to prevent flooding of areas around a drain 152 are provided. In additional aspects, the drain filter device 100 protects drains 152 and junctions boxes and is safer for pedestrians and workers, particularly machine operators. In further aspects, the drain filter device 100 is reusable, reducing wasted materials, and stronger than current devices for the purposes due to the structure's particular frustum shape 120 and the materials from which the device is constructed. Indeed, in aspects, the increased strength and resilience of the drain filter device 100 stemming from the structure reduces collapse of or damage to the particular device 100. Further, in aspects, the increased strength and resilience of the drain filter device 100 stemming from the structure further promotes the safety of the device 100 to pedestrians and workers and further prevents contamination and clogging. Moreover, in aspects, the drain filter device 100 is easier to use, install, and store away. Indeed, the drain filter device 100, due to its particular frustum shape 120 promotes the devices ability to remain stationary once installed, further preventing accidents and promoting safety.

Figure 13:
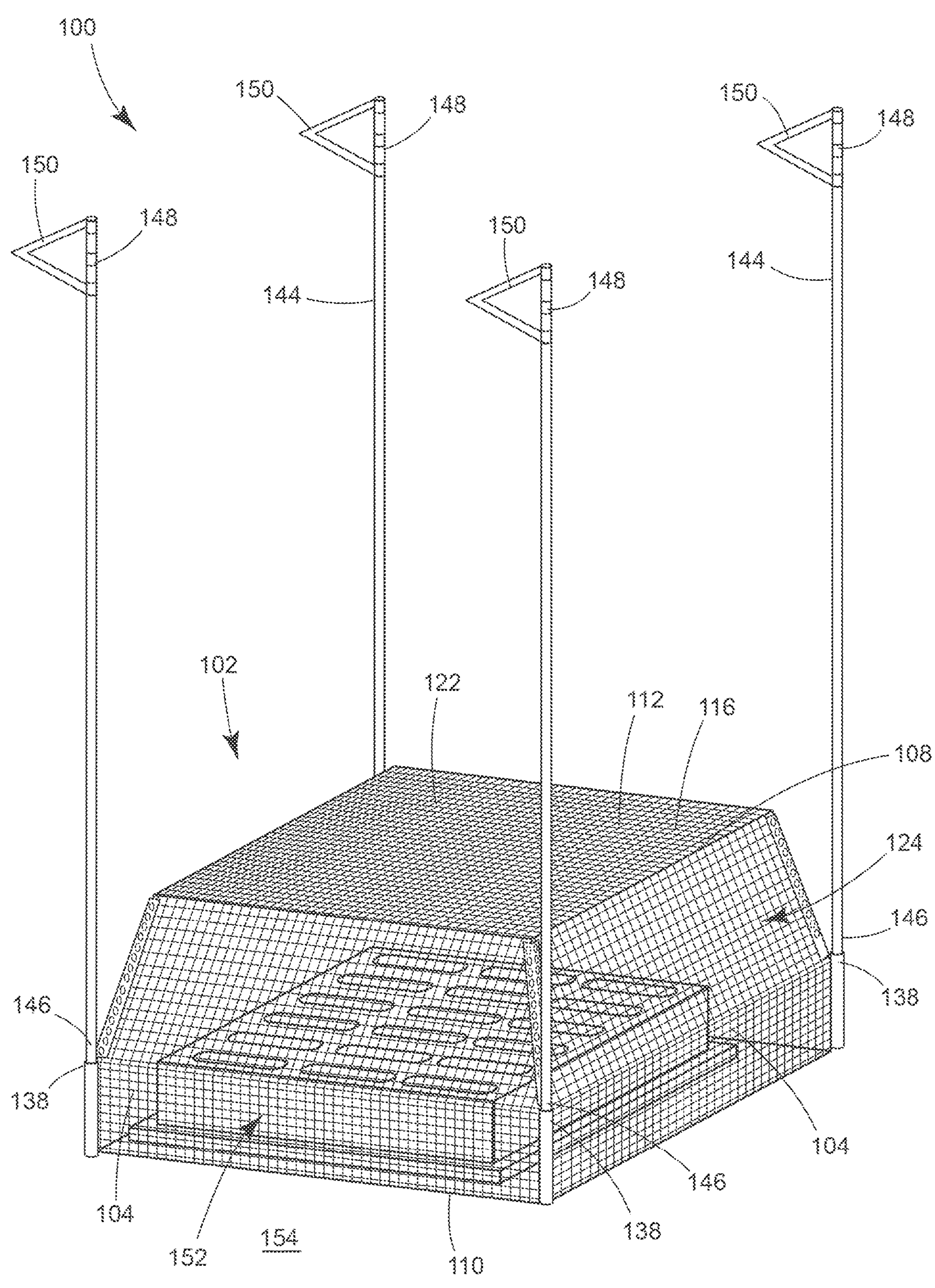
FIG. 13 is a perspective view of a storm water drain filter device according to at least one embodiment installed over an open drain and having extension members affixed thereto.
Figure 14:
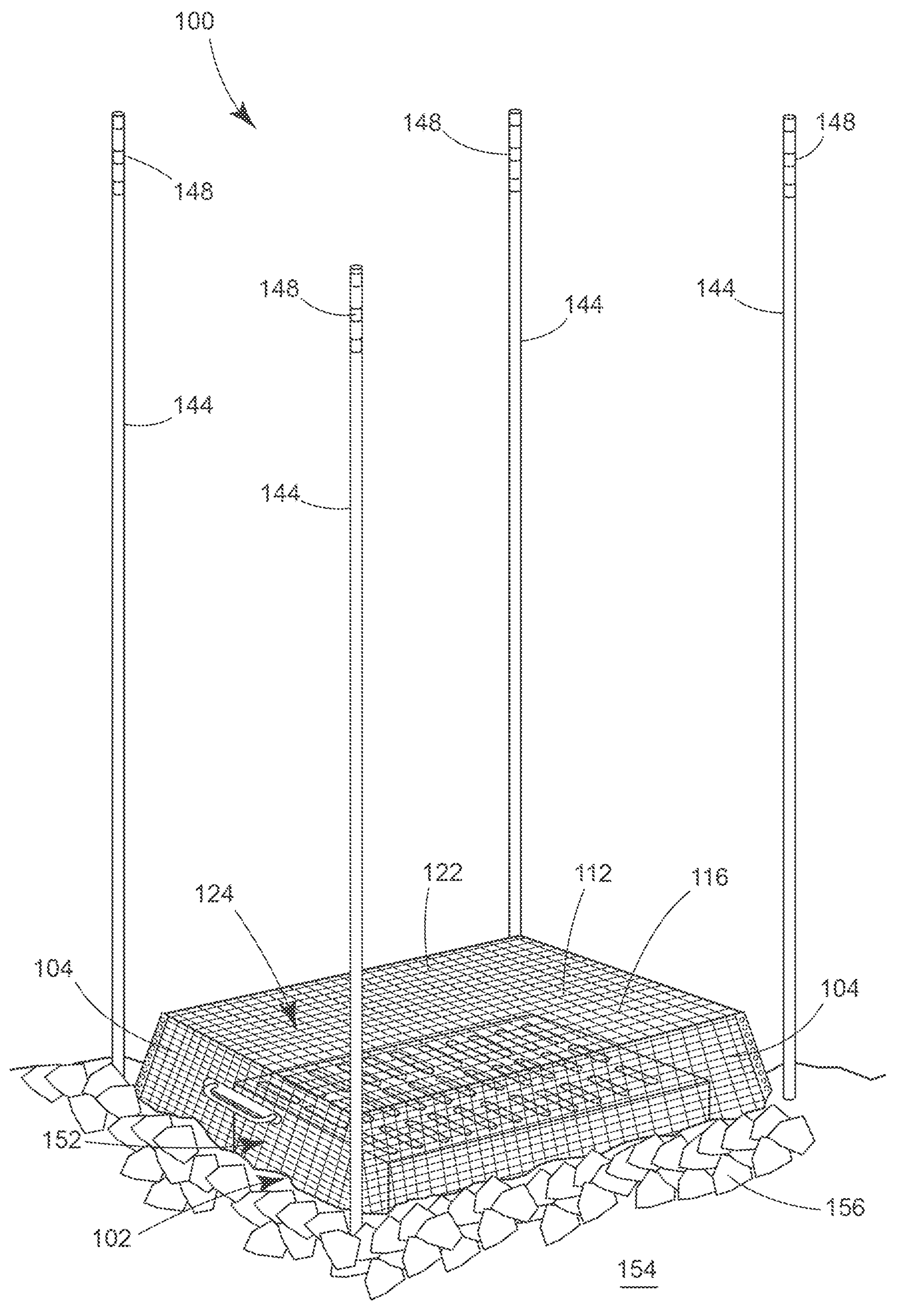
FIG. 14 is a perspective view of a storm water drain filter device according to at least one embodiment installed over an open drain and with rock fill piled around the device to further secure it.

In embodiments, the storm water drain filter device 100 generally comprises a basket structure 102 having at least a portion of a frustum shape 120 and having side walls 104 and a top panel 112 made from or having portions having a mesh material 122, the structure 102 defining an interior space 124 and having one or more spikes 132, as in FIGS. 1 and 9-12, to secure the device 100 in the ground 154, as in FIGS. 13-14. For the purposes of clarity, a frustum shape 120 is a 3D shape enclosed between the two parallel planes of another solid that is cut into two parts. Examples of a frustum could be created by cutting the apex of a pyramid off with a plane parallel to the pyramid's base or cutting the apex of a cone off in a similar fashion. In the embodiment of FIG. 1, a portion the basket structure 102 forms a rectangular frustum shape 120 as both the upper base, occupied by the top panel 112, and lower base thereof, the bottom opening 118, have rectangular shaped cross sections.

Basket Structure

In embodiments, such as those of FIGS. 1 and 9-12, the device 100 comprises a basket structure 102 which defines an interior space 124 which, when in contact with the ground 154, allows for the entry of water but filters out various debris. The basket structure 102 has a top panel 112, affixed to various side walls 104, and opposed to a bottom opening 118. Accordingly, the structure 102 can be placed onto a drain 152 so that the drain 152 is surrounded by the bottom opening 118 and extends into the interior space 124 towards the top panel 112. As shown in FIG. 1, the side walls 104 are affixed together along their side edges 106, the side walls 104 are affixed to the top panel 112 about their top edges 108 and the side walls 104 each have a bottom edge 110, opposed to the top edge 108, which borders the bottom opening 118.

Mesh Material

In embodiments, the side walls 104 and top panel 112 of the basket structure 102 comprise a mesh material 122 formed of intersecting rods of various diameters, as shown in FIGS. 1-3 and 5. Although rods are utilized herein, it is also foreseen that bars, strip, or other shaped elements might be utilized in the construction of the mesh material 122. Indeed, the side walls 104 might comprise sheets of material with openings cut therein, in certain embodiments. In addition to the use of intersecting rods of various diameters to construct a mesh material 122 of the side walls 104, the intersection of the various portions can be varied to create openings of different sizes in different portions of the side walls. Indeed, as shown in FIG. 1, the mesh material 122 can have a smaller opening size **122*a* near the bottom edge 110 and larger opening size 122*b* near the top edge 108 of a side wall 104. Indeed, the different sizes of openings (122*a*, 122*b*) in the mesh material of FIG. 1 allows each portion of the side wall to be porous to liquids, like water, but more likely to prevent the passthrough of materials each segment is likely to encounter when installed. For example, the smaller openings 122*a* near the open edge 110 would prevent the passthrough of dirt and mud, which that portion of the side wall 104 is more likely to encounter and the larger openings 122*b* near the top edge 108 would prevent the passthrough of cups and branches, which that portion of the side wall 104 is more likely to encounter, as those items float. Although FIG. 1, among others, demonstrates an embodiment where the openings of the mesh material 122 are different sizes (122*a*, 122*b*) along different portions of the basket structure 102, these openings may be of a uniform size in other embodiments, as shown in FIGS. 9-12. While the variation of sizes of the openings of the mesh material 122** may be beneficial in certain contexts, it may be wholly unnecessary in others, allowing a simpler and more cost efficient one-size opening embodiment to be utilized.

Aperture and Access

In embodiments, basket structure 102 includes one or more apertures 114 through a portion thereof. For example, the embodiment of FIG. 1 includes an aperture 114 in the top panel 112. The aperture 114 provides an access point for a user to access a junction box or drain 152 without the removal of the entire basket structure 102. Although the embodiment of FIG. 1 has an aperture 114 in a top panel 112 of the basket structure 102, it is also foreseen that other portions of the basket structure 102 might comprise a similar aperture 114. For example, an aperture 114 may be formed in one, or more, of the side walls 104 or some combination of side wall 104 and top panel 112 in embodiments.

In still yet further embodiments, the basket structure 102 might allow for portions thereof to be openable to access the interior space 124. For example, rather than having an aperture 114, the top panel 112 may be composed of two pieces, one or both of which are pivotable open about a hinge 130 that connects one of the edges of the portion of the top panel 112 to the top edge 108 of a side wall 104 in embodiments. Thereby, a portion of the top panel 112 itself may be pivotable about a hinge 130 to open and exposed the interior space 124, instead of just having an aperture 114 through the top panel 112. In further embodiments, this pivotable portion or another part of the basket structure 102 may further have a locking attachment 128 that is selectively engageable to secure the portion in a closed and secure position. For example, a side wall 104 may have a hook that is deployable therefrom to contact and selectively secure a pivotable portion of the top panel 112 closed. In additional embodiments, one or more of the side walls 104 may have portions that are, similarly, selectively affixed together.

Figure 3:
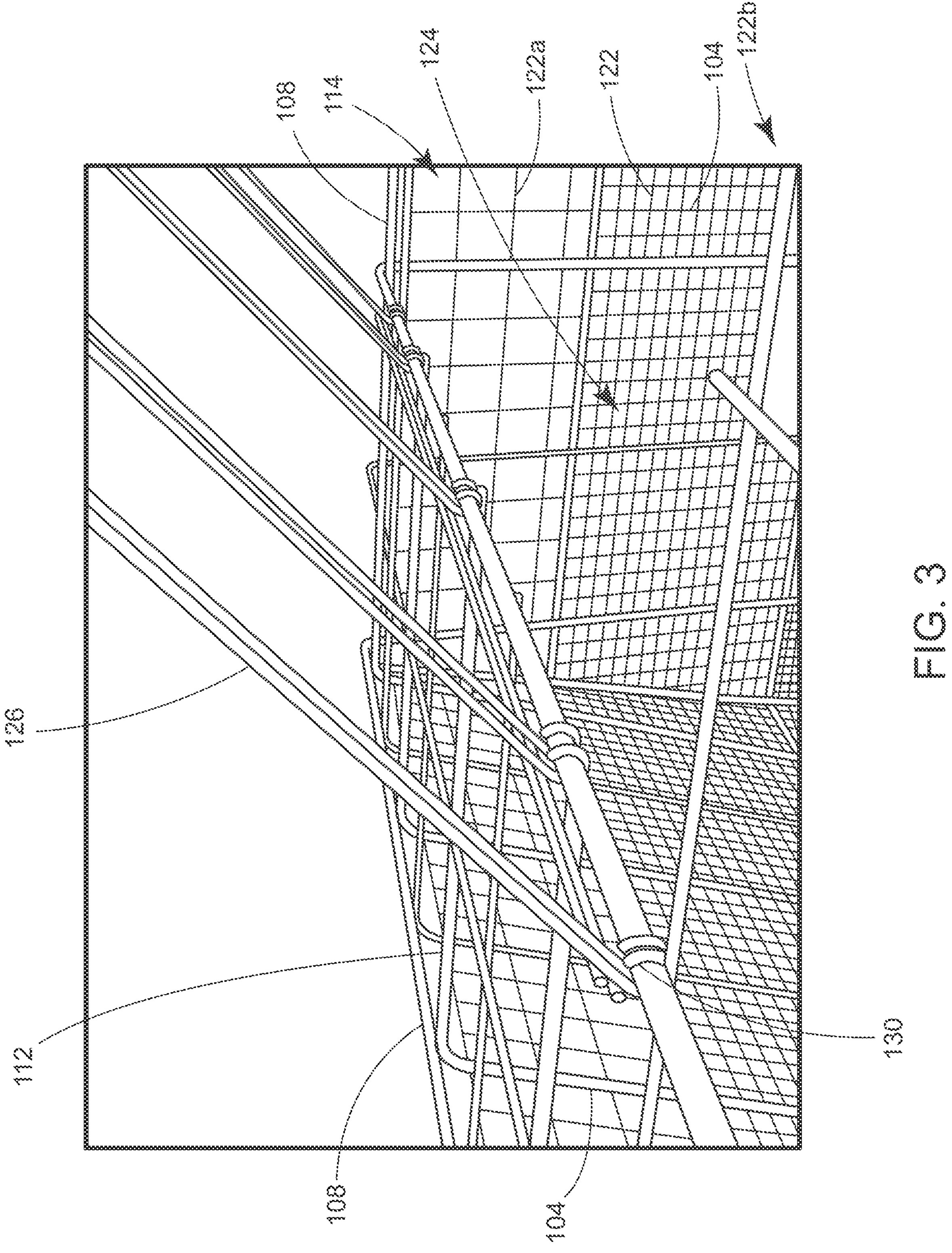
FIG. 3 is an a close up view of the connection of a door panel with a top panel of a storm water drain filter device according to at least one embodiment.
Figure 6:
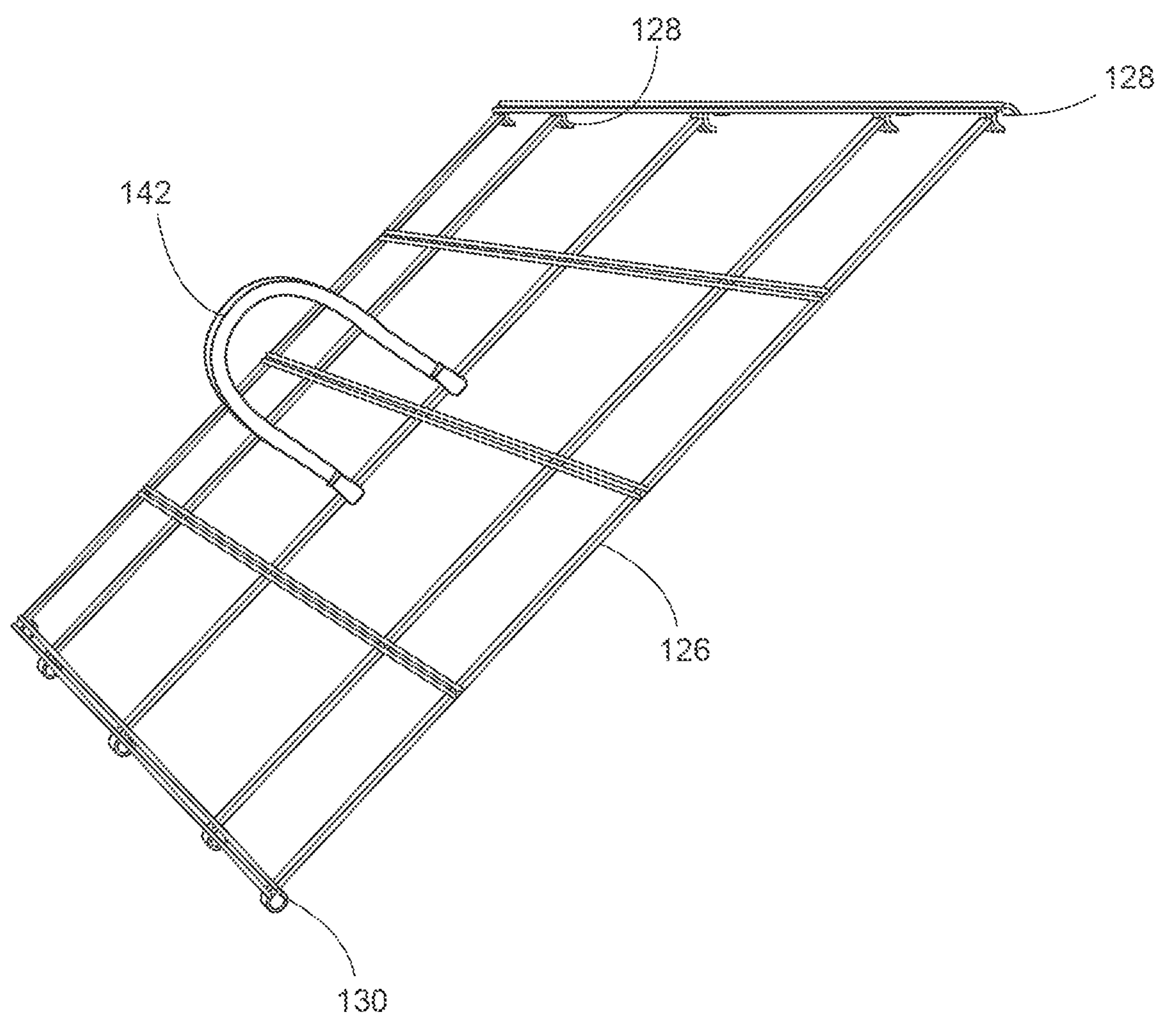
FIG. 6 is a perspective view of a door panel utilized with a storm water drain filter device according to at least one embodiment.

In embodiments, an aperture 114 may also have an adjacent door panel 126 utilized to cover the opening when not in use as shown in FIGS. 1, 3, and 6. The door panel 126 may be made of a similar mesh material 122 to that of other portions of the basket structure 102, such as the top panel 112 in embodiments. Moreover, the door panel 126 may be secured over an aperture 114 by locking attachments 128. While a hook has been described previously, other embodiments of a locking attachment can include a clamp, segments of hook and loop fasteners, clips, ties, or the like, in embodiments. These locking attachments 128 may be separate parts, of have portions affixed to the door panel 126 and selectively engageable with portions of the basket structure 102, or vice versa. In embodiments, a portion or an edge of the door panel 126 may be pivotally connected to a portion of the basket structure 102, such as the top panel 112, such as by a hinge 130 as in FIGS. 1 and 3. Thereby, when opened, the top panel 112 may remain affixed to the basket structure 102 and thereby not be lost. However, in at least one embodiment, the door panel 126 is fully separable from the basket structure 102 and may be tethered by a cord, cable, or other link to not be lost.

Additionally, in embodiments, the basket structure 102 may comprise portions which do not have an aperture 114, door panels 112, or hinging capabilities to open as in FIGS. 9-12.

Structure Shape

Although FIGS. 1 and 9-12, among others, demonstrate an embodiment where the basket structure 102 comprises a frustum shape 120 having rectangular shaped cross sections, the basket structure 102 may have any useful shape in other embodiments. Indeed, in embodiments, the basket structure 102 might have fewer side walls 104 and/or no top panel 112 when forming certain shapes. Moreover, in embodiments, it is also foreseen that the basket structure 102 can have one or more additional side walls 104, or other peripheral walls, or other segments forming another shape. Indeed, the portion of the basket structure 102 forming the frustum shape 120 is integrally formed with an additional portion forming a rectangular prism shape adjacent the bottom opening 118 in FIG. 1. Moreover, in at least one embodiment, the frustum shape 120 could be of a conical variety, rather than that based on a pyramid. In embodiments, as shown in in FIGS. 9-12 particularly, the frustum shape 120 may be created by having a top edge 108 and bottom edge 110 be different lengths. Indeed, a comparison of FIGS. 9-12 demonstrate the top edge length 108ℓ is shorter than the bottom edge length 110ℓ which helps to create the frustum shape 120.

Further, embodiments of the device 100 might be constructed to any dimensions useful to a task, such as covering, wholly or in part, a particular sized storm drain or junction box opening. In a preferred embodiment for a storm water drain 152, the bottom opening is defined by a first pair of parallel bottom edges 110 (of opposing side walls 104) of a length 110ℓ between 39 and 41 inches and a second pair of parallel bottom edges 110 (of opposing side walls 104) of a length 110ℓ between 49 and 51 inches. The provided preferred embodiment defines dimensions which provide coverage slightly larger than the dimensions of a standard storm water drain 152 or junction box. Thereby, the preferred embodiment of the device 100 covers a standard storm water drain 152 or junction box without being unnecessarily larger than such dimensions allowing work in areas closer to the drain 152 or junction box without sacrificing coverage. Moreover, it is also of note that, the top edge 108 of each respective side wall 104 is of a shorter length 108ℓ than each side wall's 104 respective bottom edge 110. For example, in embodiments, when the bottom edge length 110ℓ is between 39 and 41 inches, the top edge length 108ℓ is between 33 and 35 inches and when the bottom edge length 110ℓ is between 49 and 51 inches, the top edge length 108ℓ is between 43 and 45 inches. However, each respective top edge 108 may be any smaller length or may be the same, forming a cube or rectangular cube with an open side (a respective bottom opening 118). Moreover, in certain embodiments, the top edge length 108ℓ may be longer than a respective bottom edge length 110ℓ, making a frustum shape 120, but upside down.

Flange Bottom Opening

In various embodiments, the bottom edge 110 of each side wall 104 may have a flange portion extending away from the edge inward or outwards. In embodiments with an inward extending flange, the flange can be configured to provide a tighter fit with a drain 152 to prevent water and debris from bypassing the device 100 by going under a respective bottom edge 110 and up through the bottom opening 118 instead of being siphoned through the mesh material 122 of a side wall 104. In embodiments with an outward extending flange, the flange can be configured to provide a surface for additional interaction with the ground 154 and upon which fill 156 may be stacked to additionally stabilize and weight the device 100 down. These flange surfaces may also provide surfaces from which a spike 132 may extend, in addition to or in alternative to other portions of the basket structure 102. Likewise, the flange surfaces may also provide a connection point for additional securing devices, such as straps or anchors, to secure the device 100 to a particular drain 152 or opening the structure 102 is covering.

Spikes and Attachments

Figure 2:
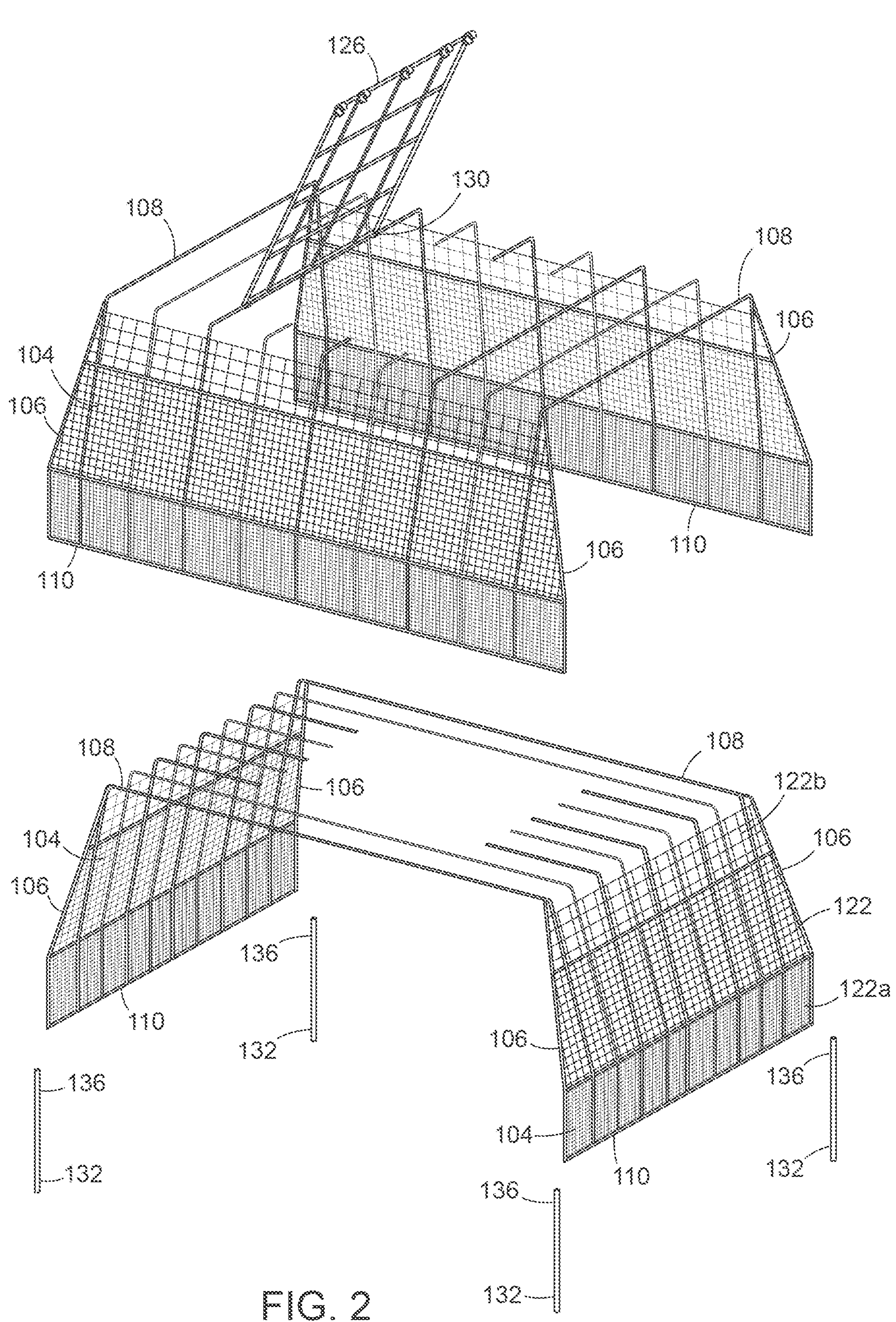
FIG. 2 is a perspective exploded view of a storm water drain filter device having various portions separated according to at least one embodiment.
Figures 7, 8:
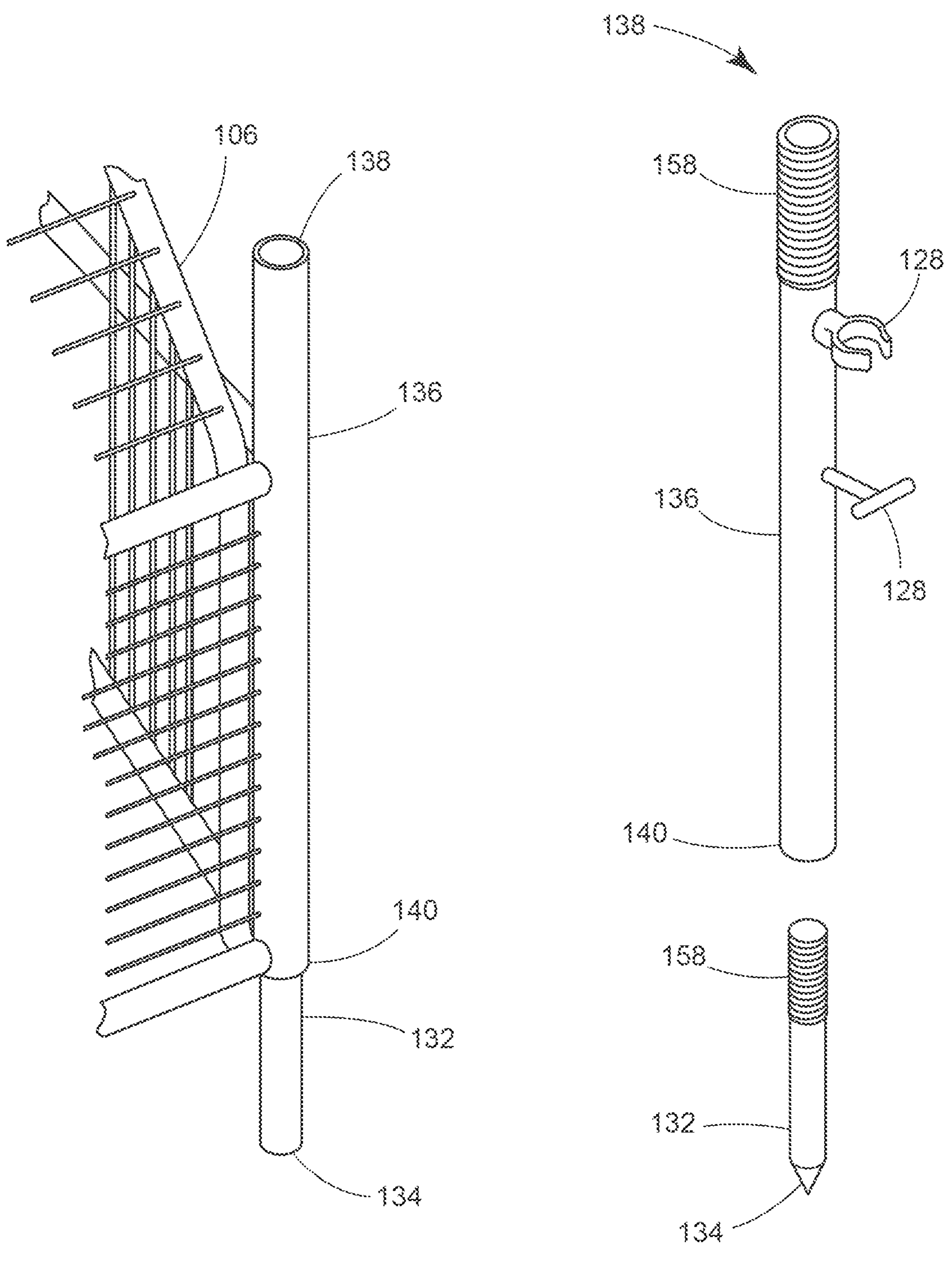
FIG. 7 is a perspective view of a rod portion with a spike utilized with a storm water drain filter device according to at least one embodiment.
FIG. 8 is a perspective view of a rod portion with a removable spike, a threaded connector at the second end, and various locking attachments on a rod portion utilized with a storm water drain filter device according to at least one embodiment.
Figure 9:
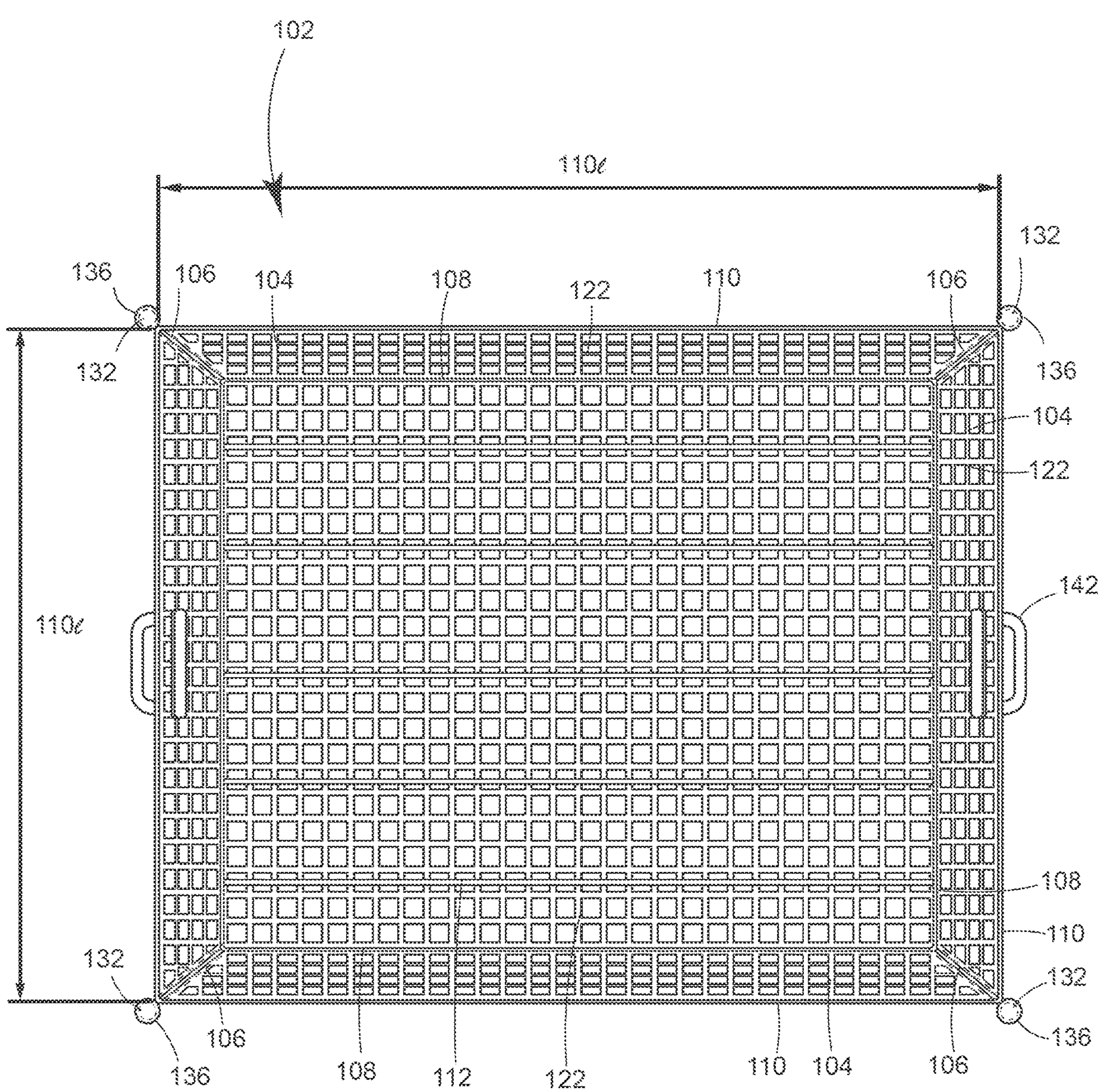
FIG. 9 is a top plan view of a storm water drain filter device according to at least one embodiment.
Figure 10:
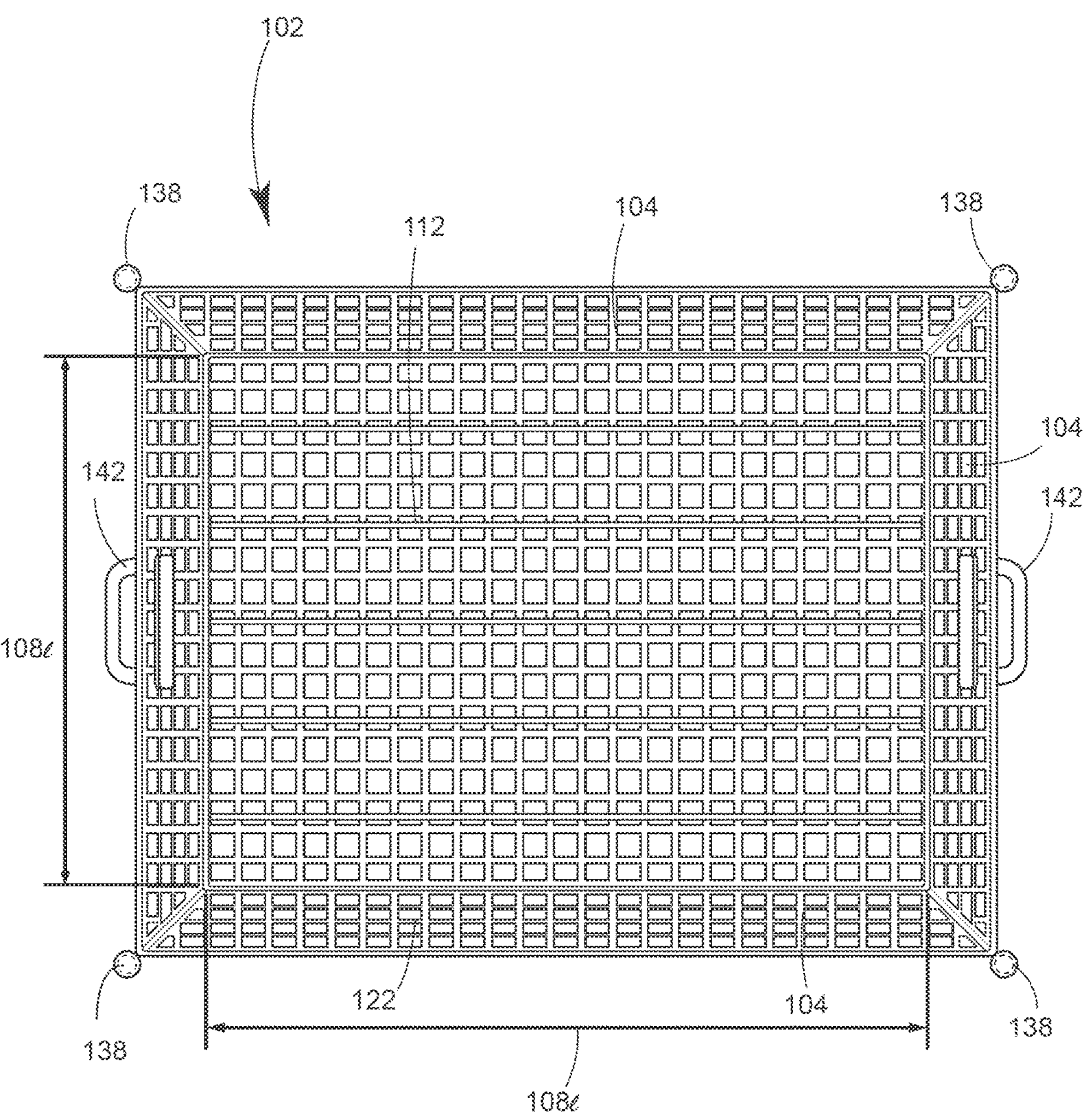
FIG. 10 is bottom plan view of a storm water drain filter device according to at least one embodiment.
Figure 11:
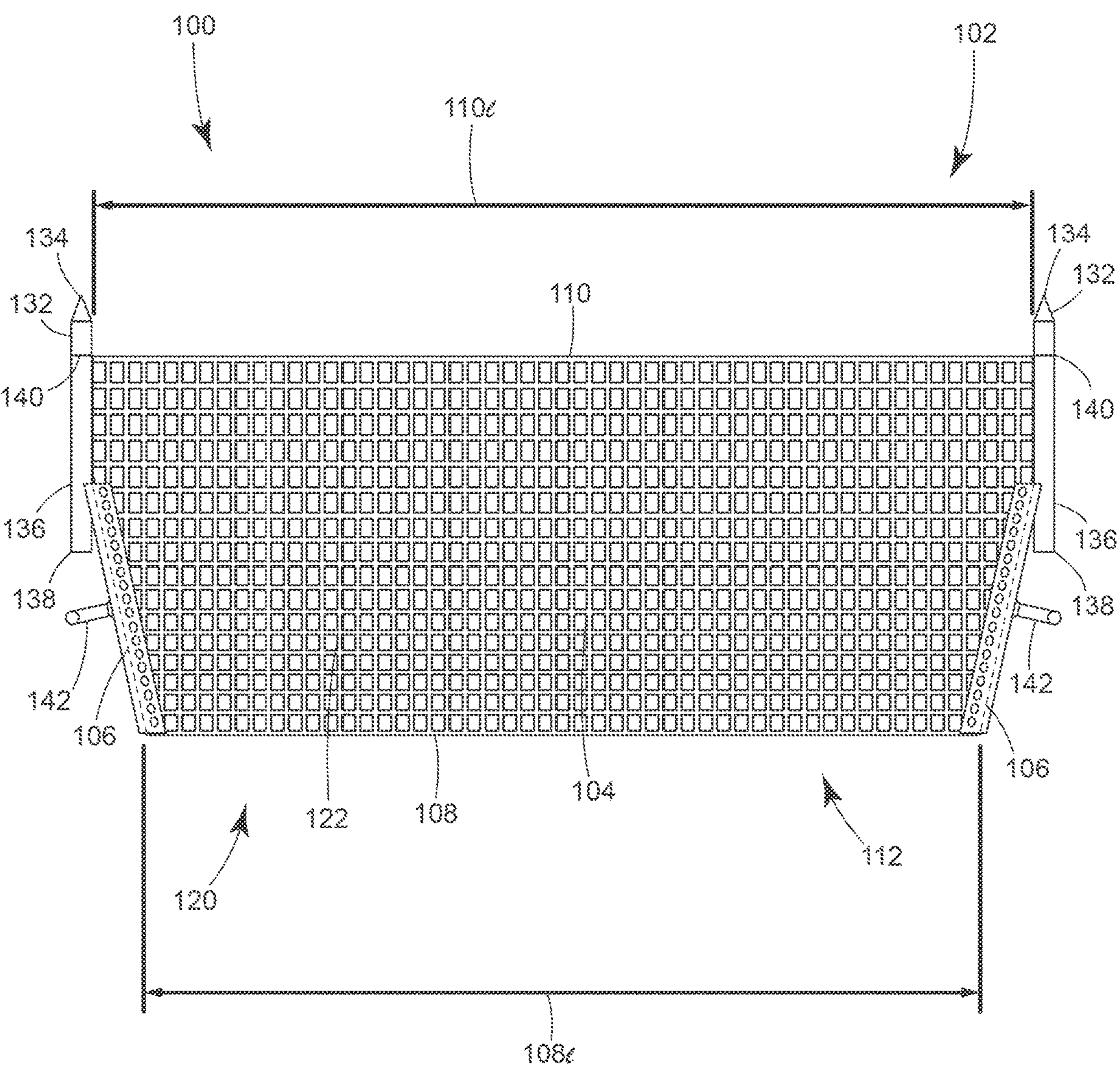
FIG. 11 is a front elevation view of a storm water drain filter device according to at least one embodiment.
Figure 12:
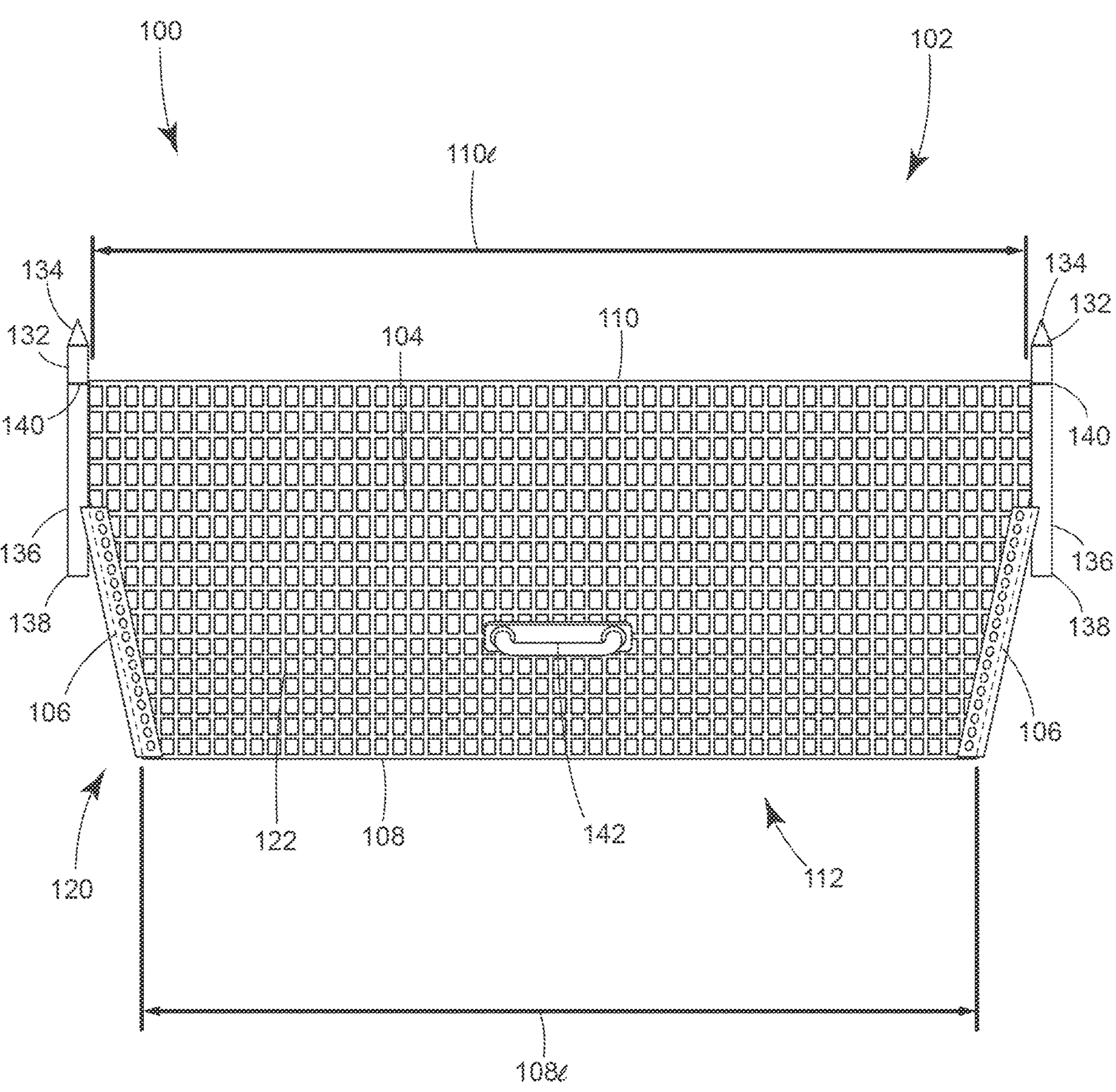
FIG. 12 is a side elevation of a storm water drain filter device according to at least one embodiment.

In embodiments, like that of FIG. 1, the device 100 further comprises one or more spikes 132 disposed adjacent the bottom opening 118 and extending away from the bottom edge 110 and basket structure 102. In embodiments, the spikes 132 are configured for the basket structure 102 to be secure to the ground 154, such as the ground 154 around an open storm water drain 152 or junction box on a construction site. Indeed, FIG. 13 illustrates a device 100 secured in place with spikes 132 placed into the ground 154 around a drain 152. As shown in FIGS. 2, 7 and 8, the spikes 132 might be attached to the basket structure 102 through rod portions 136 affixed to the basket structure 102 adjacent to the bottom opening 118 thereof in at least one embodiment. Indeed, as shown in FIG. 8, the spike 132 may have a pointed end 134 and another opposed end which mates with a second end 140 of the rod portion 136, such as through mating threaded portions. However, in embodiments, the spikes 132 may be attached directly to portions of the basket structure 102, such as the bottom edge 110 or a flange therefrom, as discussed above. Moreover, it is foreseen that the spikes 132 might be removably affixed to the basket structure 102 and/or the rod portions 136 in certain embodiments to allow for replacement of damaged parts-increasing the longevity of the device 100. Similarly, it is also foreseen that the rod portions 136 might be removably affixed to the basket structure 102 in certain embodiments. For example, in embodiments the rod may have locking attachments 128, similar to those described previously, or different, such as an extension that mates, though insertion, into a channel formed into a portion of the basket structure 102, as in FIG. 8.

While the spikes 132 provide a beneficial and versatile means of securing the basket structure 102 in place, in at least one embodiment, the spikes 132 may be replaced with other attachment means, such as straps or anchors, to secure the device 100 to a particular drain 152 or opening the structure 102 is covering. Moreover, the device 100 may also utilize an alternative to the spikes 132 without utilizing a flange adjacent the bottom opening 118.

Rod Portions

As discussed above, the device 100 may have rod portions 136 affixed, in a permanent or removable fashion, to the basket structure 102, as in FIGS. 1 and 7-12. In embodiments, like that of FIG. 1, the rod portions 136 comprise a free first end 138, opposed to the second end 140 that can mate with or carry a spike 132, disposed between a plane in which the bottom opening 112 is disposed and a plane in which the top panel 112 is disposed, when affixed to the basket structure 102. In embodiments, the free first end 138 is configured to engage the bottom end 146 of an extension member 144, as will be discussed below. In embodiments, the first end 138 of the rod portions 136 may be hollow (as in FIG. 7) and able to accommodate an insertable portion of an extension member 144 or to accept a pointed end 134 of a spoke 132 when similar structures 102 are stacked, as in FIG. 4. In another embodiment, the first end 138 of a rod portion 136 may be threaded to mate with a threaded bottom end 146 of an extension member 144, as in FIG. 8. In certain embodiments, the first end 138 of the rod portion 136 may be filled, and the bottom end 146 of the extension member 144 may have a cavity for insertion of the first end 138. In at least one embodiment, the first end 138 of the rod portion 136 is capable of nesting into a second end 140 of another rod portion 136 when the spike is removed 132, to accommodate stacking as in FIG. 4. Indeed, the spikes 136 may be replaceable and configured to be one-use, left in the ground 154 when the basket structure 102 is moved.

Extension Member

In embodiments, the device 100 includes one or more extension members 144 as in FIGS. 13 and 14. In embodiments, the extension members 144 comprise a tubular member that at a bottom end 146 engages the basket structure 102 and at a top end 148 is designed to provide a visual indicator of the presence of a drain device 100. In embodiments, the tubular member may include one or more signal devices 150 at an end thereof designed to enhance the visibility of the extension member 144, as in FIG. 13. The signal device 150, in embodiments, may comprise a flag (as in FIG. 13), reflective devices (as in FIG. 14), a brightly colored top end 148, a light (flashing or continuous), or some other visual indicator of the presence of a device 100.

In use, the extension members 144, and any signal device 150, are configured to provide notice to pedestrians, workers, and even machinery of the location of the device 100, enhancing safety and reducing the likelihood of damage in embodiments. For example, an extension member 144 indicate to a machine operator that they cannot drive over a certain area due to the presence of a basket structure 102 which might be damaged, requiring repair or replacement.

Although embodiments herein describe and disclose an extension member 144 being connected to the free first end 138 of a rod portion 136, in certain embodiments the rod portion 136 itself might be integrally formed with the extension member. Thereby, an extension member 144 might be affixed, in a permanent or removable fashion, to portions of the basket structure 102, in various embodiments, similar to the way the rod portion 136 can be affixed to the basket structure 102. Moreover, an extension member 144 might be affixed, separately from the rod portion 136 at all, to the top panel 112, a flange, or side wall 104 of a basket structure 102.

Handles

In various embodiments, the device 100 includes one or more handles 142, as in FIGS. 5-6 and 9-14. Indeed, as in FIG. 5, one or more handles 142 may be affixed to the top panel 112 in embodiments. Thereby, the handles 142 may be utilized to pick up and move a basket structure 102. As in FIG. 6, the door panel 126 can also include a handle 142, in embodiments, to allow a user to more easily move a door panel 126. Alternatively, or additionally, the device 100 may have handles 142 along one or more side walls 104 in embodiments as in FIGS. 9-14.

In additional embodiments, one or more handles 142 might be removably affixed to portions of the basket structure 102 allowing for their replacement. Moreover, in certain embodiments, one or more handles 142 might be selectively attachable over a number of portions of the basket structure 102 to allow a user the ability to select a convenient portion to attach a handle 142 to. The ability to remove the handles 142 also can facilitate more efficient stacking and storage of the basket structures 102 by removing potential impediments to their nesting in embodiments. In a preferred embodiment, at least two handles 142 are affixed to the basket structure 102. In at least one embodiment, a handle 142 may have a dual function as a locking attachment 128, such as by being a C-shape clamp.

Signaling Device

In various embodiments, the device 100 might further comprise one or more signaling devices 116, similar to but separate from the signal device 150 of the extension member 144. Indeed, a portion of the basket structure 102, such as the top panel 112, may have a signaling device 116, such as a painted portion, a reflective marker, a light, or some combination thereof, in embodiments. For example, the top panel 112 and a portion of the side walls 104 of the basket structure 102 are painted a vivid noticeable color and have a design, specifically letters and numbers, in the embodiments of FIGS. 13 and 14. The signaling device 116, in embodiments, can also provide an identification element for a location, such as a placement marker, which might be helpful in planning and organization of a worksite. In at least one embodiment, the signaling device 116 may also be a unit which can be tracked or identified with a separate finding unit in case the device 100 gets covered or lost. For example, the signaling device 116 can be a RF tracker, radio beacon, or GPS tracker in embodiments.

Storage

Figure 4:
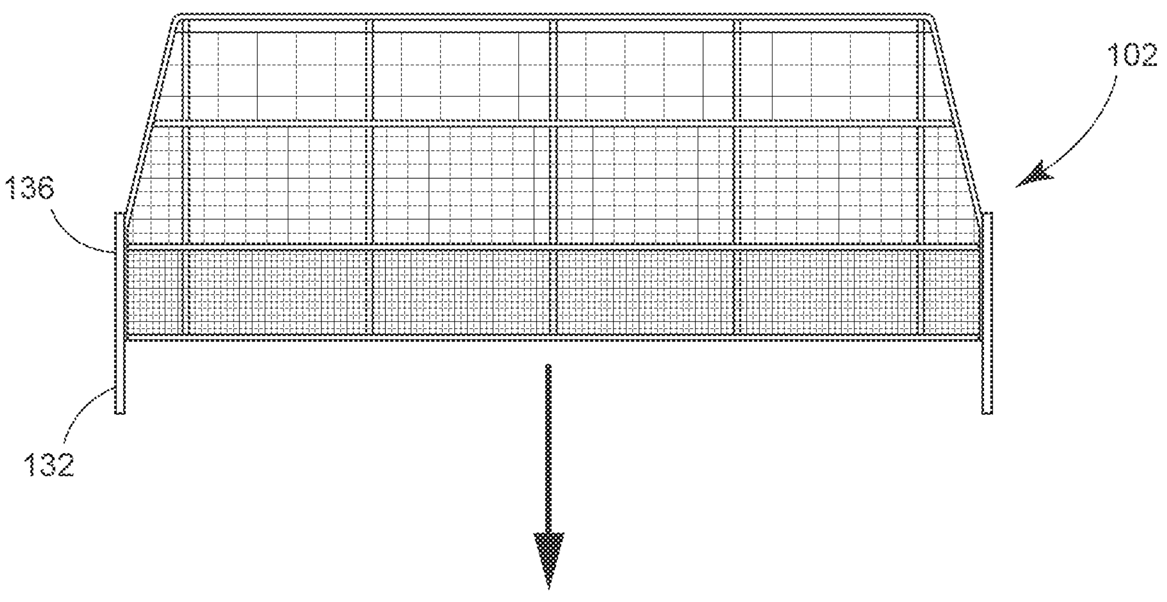
FIG. 4 is an elevation view of a series of storm water drain filter devices according to at least one embodiment in a stacked storage configuration.
Figure 4:
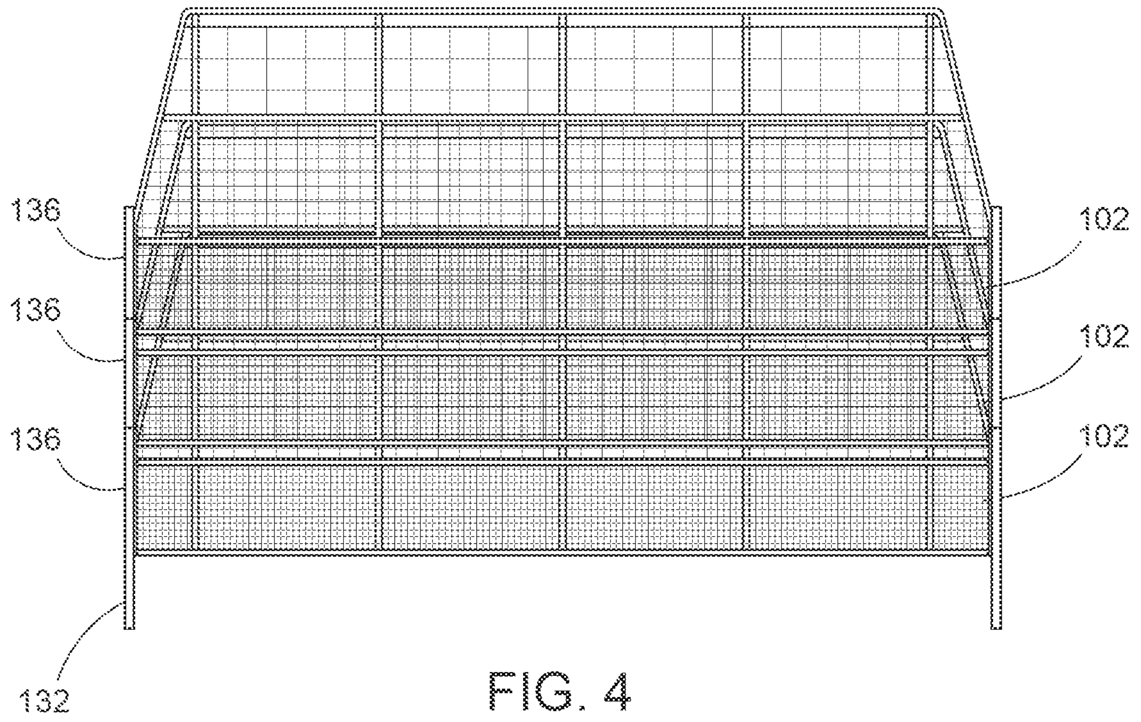

In embodiments, the device 100 comprises a rod portion 136 like that shown in FIGS. 4 and 7, being tubular in form and having a first end 138 and opposed second end 140 from which a spike 132 is attached or integrally formed. As shown in FIG. 7, the rod portion 136 might comprise a hollow segment accessible through the first end 138 thereof in embodiments. The rod portion 136 therefore might be configured to accept the spike 132 of another rod portion 136 attached to another basket structure 102 to facilitate nested stacking as shown in FIG. 4. Thereby, the device 100 might be more efficiently stored when not in use through its ability to be stacked. While the above embodiments involve the nested arrangement of a spike 132 and the first end 138 of a rod portion 136, in other embodiments the second end 140 of a rod portion 136 may mate with the first end 138 of a rod portion 136, and thereby accommodate stacking even without a spike 132.

Figure 5:
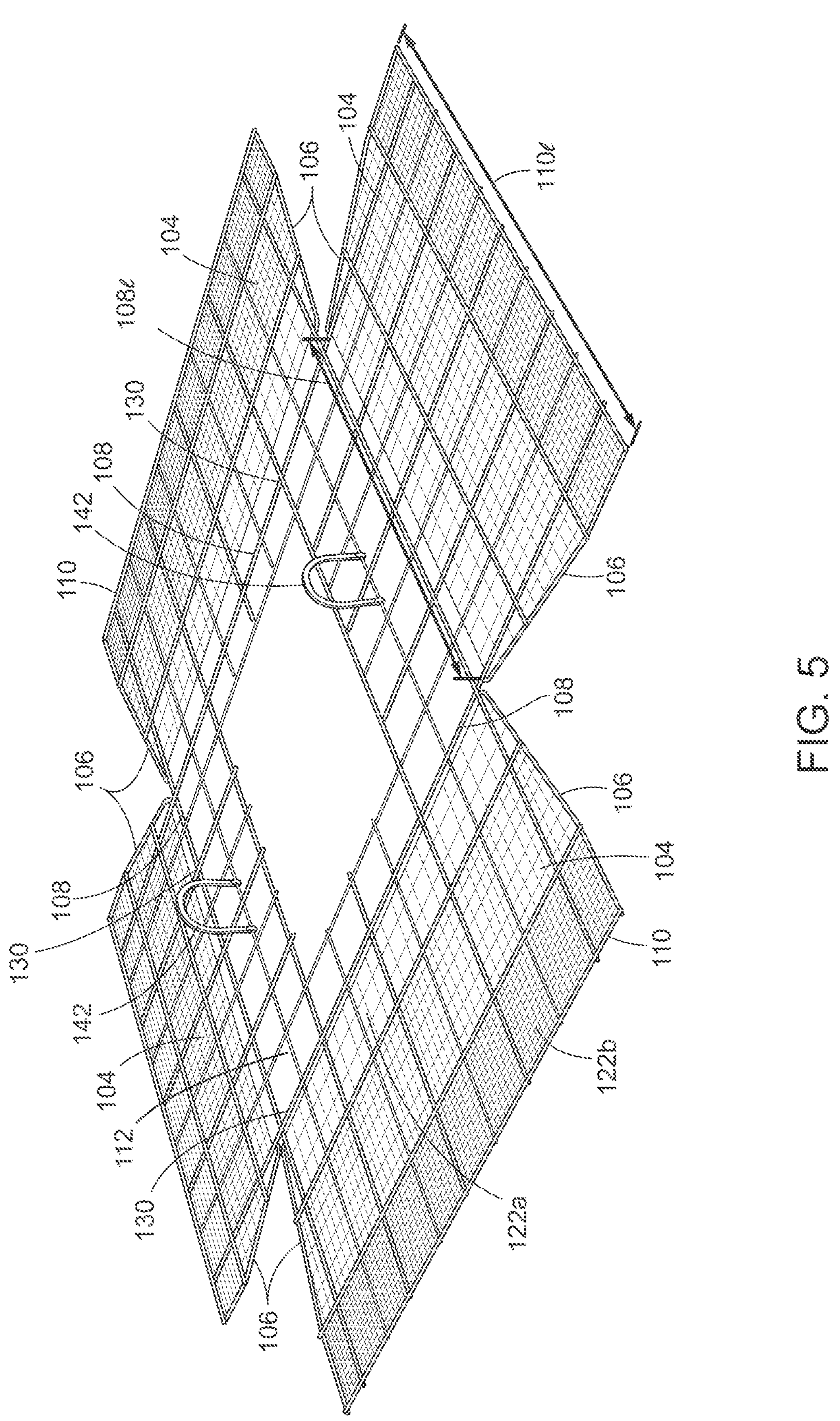
FIG. 5 is a top perspective view of a storm water drain filter device according to at least one embodiment in a collapsed configuration.

In particular embodiments, portions of the device 100 might be removably attached, such as by locking attachments 128, and/or pivotally attached, such as by hinges 130, to facilitate the ability of the basket structure 102 to collapse or fold between a use configuration, such as that of FIG. 1, and a storage configuration, such as that of FIG. 5. In embodiments, a stored configuration might be one in which portions of the device 100 might be flatted, as in FIG. 5, or portions of the device 100 might be folded into an adjacent, parallel, and stacked configuration to save space or be stored. Although the embodiment of FIG. 5 flattens into the storage configuration, it is also foreseen that one or more portions thereof might be folded together to provide a storage configuration that is more compact and utilizes less surface area. Further, in embodiments, portions of the device 100 might be removably attached to also allow for a reconfiguration thereof into a storage configuration.

In a particular embodiment, the device 100 may comprise at least two integrally formed segments which combine to form a single basket structure 102, as in FIG. 2. Indeed, in embodiments, the top panel 112 may be formed by layering of wire segments connecting two opposed side walls 104. In certain embodiments, a basket structure 102 may be separable into such parts as shown in FIG. 2. In at least one other embodiment, each of the side panels 104 and top panels 112 may be independently separable from one another, such that a basket structure 102 may have 5 separate portions defining an interior space 124. In embodiments, these portions may be attached together along various edges, such as the side walls 104 affixed together along opposed side edges 106.

Materials

Moreover, the device 100 and portions thereof might be made with a variety of materials. Indeed, portions of the device 100 might utilize steel in their construction providing a strength and resilience that can stand up to heavy use. However, in additional embodiments, other types of metals, fiberglass, various polymers, or other suitable materials may be utilized in the construction of particular portions of the device 100. Moreover, it is also foreseen that the rods utilized in the construction of certain embodiments of the device 100 might further be hollow or utilize hollow portions to reduce the weight of the device 100. However, in at least one embodiment, all or a portion of the rods utilized in the construction of the device 100 may be solid to provide enhanced strength to the device 100.

Use

In at least one embodiment, a user may place the basket structure 102 of the device over a drain, as in FIG. 13, and secure it to the ground 154 through the spikes 132. After attachment, a user may then utilize a fill 156, such as rock, dirt, or other substance, to secure the structure 102 in place in embodiments. A fill 156, in embodiments, can be a substance which will allow water to easily channel therethrough to access the interior space 124 through the mesh material 122. In certain embodiments, the fill 156 may also include a water permeable filter material, such as a burlap, which can be placed over a portion or the entirety of a basket structure 102 to further bolster the ability of the device 100 to filter out materials which would otherwise end up in the drain 152. The fill 156, in embodiments, is selected based on the use and the characteristics of the area. Indeed, a fill 156 that is too water restrictive and does not allow water to channel therethrough at a fast enough rate may cause flooding.

While various features and elements have been described in general above, it is to be understood that no limitation of the scope of this disclosure is hereby intended. Thereby, elements and features might be utilized in any combination and for any embodiment to which it is particularly useful.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term “and/or” includes any and all combinations of one or more of the associated listed items.

It will be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present.

It will be understood that when an element or layer is referred to as being “on” another element or layer, the element or layer can be directly on another element or layer, or intervening elements or layers may also be present. In contrast, when an element is referred to as being “directly on” another element or layer, there are no intervening elements or layers present. As used herein, the term “and/or” includes any and all combinations of one or more of the associated listed items.

Spatially relative terms, such as “below,” “beneath,” “lower”, “above”, “upper”, and the like, may be used herein for ease of description to describe one element or feature’s relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a," "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced items. Although any methods, devices, and materials similar or equivalent to those described herein can be used in the practice or testing of the presently disclosed subject matter, representative methods, devices, and materials are now described.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the forms herein disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The invention claimed is:

1. A storm water drain filter device comprising:

A basket structure, wherein the basket structure comprises

A plurality of side walls affixed together along opposed edges,

A top panel affixed to a first edge of each of the plurality of side walls; and

A bottom opening disposed in a plane defined between a second edge of each of the plurality of side walls, wherein the second edge is opposed to the first edge, Wherein the first edge of each of the plurality of side walls has a shorter length than the second edge thereof, such that at least a portion of the basket structure forms a frustum shape including the top panel as a base of the frustum shape, Wherein the side walls and top panel comprise a mesh material having a plurality of openings that are porous to water, Wherein portions of the basket structure are pivotally connected and the basket structure is configured such that the portions may be pivoted between an engaged configuration to a collapsed configuration in which the top panel and the side walls are disposed in an identical plane; and At least one spike having a pointed end, wherein the spike is disposed adjacent the bottom opening such that the pointed end is disposed on an opposed side of the plane of the bottom opening to the top panel, Whereby the basket structure can be placed such that the bottom opening is disposed around an open drain and the top panel is disposed a distance above the open drain and the mesh material of the basket structure reduces debris entering the open drain.

2. The storm water drain filter device of claim 1, wherein the length of the second edge of each of the plurality of side walls is within a range of 39 and 41 inches and 49 and 51 inches.

3. The storm water drain filter device of claim 1, wherein the top panel defines an aperture therethrough to allow access to an interior space, defined between the side wall and top panel, through the top panel without adjustment of the basket structure.

4. The storm water drain filter device of claim 3, further comprising a door panel covering the aperture of the top panel.

5. The storm water drain filter device of claim 4, wherein at least a portion of the door panel is pivotally attached such that the door panel is configured to move between a closed position where the door panel covers the aperture and an open position where the aperture is uncovered.

6. The storm water drain filter device of claim 5, wherein the door panel further comprises a locking attachment whereby the door panel is secured into at least one of the open position and the closed position.

7. The storm water drain filter device of claim 1, further comprising at least one handle affixed to the basket structure to help position the device and the at least one handle is affixed to at least one of the top panel and one of the plurality of side walls.

8. The storm water drain filter device of claim 1, further comprising at least one rod portion affixed to a portion of the basket structure and disposed adjacent the bottom opening having a first end extending from the plane of the bottom opening towards a plane in which the top panel is disposed.

9. The storm water drain filter device of claim 8, wherein the at least one rod portion is removably affixed to the basket structure.

10. The storm water drain filter device of claim 9, wherein the at least one spike extends from a second end of the at least one rod opposed to the first end thereof.

11. The storm water drain filter device of claim 10, wherein the at least one spike is removably affixed to the second end of the at least one rod portion.

12. The storm water drain filter device of claim 10, further comprising an extension member comprising a bottom end and opposed top end, wherein the bottom end of the extension member is attached to the first end of at least one of the at least one rod portion and wherein the top end is disposed on an opposed side of the plane in which the top panel is disposed from the bottom end.

13. The storm water drain filter device of claim 12, wherein the bottom end of the extension member is removably affixed to the first end of at least one of the at least one rod portion.

14. The storm water drain filter device of claim 1, comprising at least one extension member affixed to the basket structure and extending away from the basket structure through the plane in which the top panel is disposed.

15. The storm water drain filter device of claim 14, wherein the at least one extension member is removably affixed to the basket structure.

16. The storm water drain filter device of claim 1, wherein the at least one spike is removably affixed to the basket structure.

17. The storm water drain filter device of claim 1, wherein the plurality of openings in the mesh material comprising the side walls adjacent the second edge differ in size from the plurality of openings in the mesh material adjacent the first edge.

18. The storm water drain filter device of claim 17, wherein the plurality of openings in the mesh material adjacent the second edge are smaller than the plurality of openings adjacent the first edge.

19. The storm water drain filter device of claim 1, wherein the top panel of the basket structure comprises a signaling device comprising at least one of a painted portion and a reflective marker to increase visibility of the basket structure.

* * * * *